UNITED STATES PATENT OFFICE.

HENRY M. JOHNSTON, OF BROOKLYN, NEW YORK.

PAINT OR COATING COMPOSITION.

SPECIFICATION forming part of Letters Patent No. 574,092, dated December 29, 1896.

Application filed April 29, 1896. Serial No. 589,553. (No specimens.)

*To all whom it may concern:*

Be it known that I, HENRY M. JOHNSTON, a citizen of the United States, residing at Brooklyn, in the county of Kings and State of New York, have invented certain new and useful Improvements in Paints or Coating Compositions; and I do declare the following to be a full, clear, and exact description of the invention.

This invention relates more particularly to paints or coating compositions for application to the interior walls (ceilings or side walls, or both) of houses by means of decorators' tools, such as brushes, hollow squeezing-tools, trowels, spatulas, or the like.

The paints or coating compositions may be applied over surfaces of more or less extent, as ground or body coatings, or as ornaments, and the coatings may be flat or with elevations or depressions, as in relief decorations made with the before-mentioned squeezing-tools.

The main object of the present invention is to produce coatings with a fibrous or textile appearance by means of paints or coating compositions which can be applied to walls of houses by decorators' tools, particularly brushes and squeezing-tools.

Such paints or coating compositions are produced in accordance with the present invention by taking strong pliable fibers, such as wool, hair, cotton, linen or flax, hemp, jute, silk, or other suitable fibers, long enough to have a definite hair-like or thread-like form, as distinguished from a mere powder, and of an average maximum length of about three-quarters of an inch (preferably from about a sixteenth to three-eighths of an inch in length, although fibers of three-quarters of an inch can be used) and incorporating such fibers in proper proportions with a strongly tenacious adhesive vehicle to form a composition applicable with a brush or squeezing-tool or other decorator's tool, in which composition the fibers shall remain diffused and which when applied to a wall shall give coatings with a fibrous or textile appearance.

As large an amount of fibers may be incorporated as the vehicle will carry, or as little as will suffice to give a fibrous or textile appearance to the surface of the coatings, which may be of one or more coats. The fibers may be of different lengths in the same batch of paint or coating composition, although preferably as near as may be of about the same length. They may be cut to proper length by machinery.

The vehicle must be something more than a wash or mortar. It must not only be of consistency to make with the fibers a mass which can be itself applied with one or more of the decorators' tools, but it must have also an adhesive tenacity to enable it to hold the fibers individually, so that they remain disseminated through the same and do not ball under the brush nor accumulate in the interior of the coatings formed with the squeezing-tool.

Approved formulas to serve as examples or illustrations will be given below. The compositions can be applied to all sorts of materials, whether rigid (as wood, brick, stone, plaster, or the like) or flexible, (as cloth, paper, or the like.)

Although compositions within the invention can be made in which the vehicles do not contain filling or pigmentary substances, (that is to say, comminuted or powdered substances that are undissolved in the compositions when these are applied,) yet the use of these substances is important and constitutes a special improvement. They are necessary for many artistic effects, and apart from the question of such effects their use is advantageous, since many cheap substances will serve as pigment or filler.

The new paints or coating compositions may be mixed in any suitable way; but it is advantageous to mix the fibers in a dry state with a solid subdivided substance or composition of a strongly tenacious adhesive nature (as, for example, comminuted glue or starch or the like or mixtures thereof) or with such strongly tenacious adhesive substance or composition and a filler or pigment.

By means of the new and improved paints not only can simple fibrous-surfaced coatings be produced, but coatings can also be obtained in which the fibers (or some of them) contrast in color (more or less, as may be desired) with the body or the ground of the coatings. To accomplish this, all or a part of the fibers employed are of a color which differs (in hue, tint, shade, or otherwise) from the vehicle, and if the color of the fibers is hidden or too much obscured in the coatings the surface is washed with a solvent liquid to remove the coloring substance from over the fibers. The difference in color may be natural to the fibers and vehicle, respectively, or the desired color may be artificially given to either. Thus a highly-colored pigment (which is insoluble or, if soluble, is in excess of the solvent capacity of the liquid) may be employed in the vehicle in connection with the fibers in the natural (bleached or unbleached) condition, and the colors of the fibers may be brought out by washing the coating, or the vehicle may be stained or colored without containing undissolved (soluble or insoluble) pigment, or the fibers may be stained or colored in any suitable way, or both fibers and vehicle may be artificially colored more or less, as may be thought proper. With vehicles which yield transparent or translucent films the fibers may show as lines of contrasting color without washing, although they could be washed also. The washing has the effect of giving prominence to the fibers, and can be resorted to for that purpose simply, as, for example, in cases where the vehicle and the fibers are of the same color.

Coatings may be formed by successive applications, and the outer coat may be so thin or so transparent or translucent that the film in the lower coat or coats appear through the same. In such cases the fibrous or textile appearance may be due to the fibers of more than one coat. The fibers in the successive applications (or even in the same coat) may differ in name, diameter, length, or color.

Instead of forming fibrous-surfaced coatings on the walls of houses walls may be decorated with fibrous-surfaced coatings which have first been formed and then applied to the wall. For example, relief decorations may be formed by squeezing fibrous plastic paint (such as hereinabove specified) through a hollow tool or by pressing it in a mold or by otherwise shaping it, and when the articles so formed have hardened they can be attached to the wall by cement, nails, or other means.

Instead of making relief decorations to be attached to the wall the fibrous-surfaced coatings could be given other forms. A fibrous paint could be made into a sheet or film having a fibrous or textile appearance, or the fibrous and more or less plastic or fluid paint could be applied with a brush, squeezing-tool, trowel, or other appliance onto a cloth, paper, or other backing to form a wall-coating which could be secured in any suitable way.

Stains or pigmentary or filling substances, or both, may be used in any form of the fibrous-surfaced coatings, and so may fibers which contrast in color with the ground or with one another. Coatings may be washed with solvent liquid whether formed on or off the walls. Fibrous-surfaced coatings or hardened compositions of any of these forms or kinds, whether hardened on or off the wall, with or without a backing, are believed to be new and are included in the invention.

It is also believed to be new to use fibers of the before-mentioned kind and length on the interior walls of houses in conjunction with a material of suitable tenacity or adhesiveness to hold them in place by applying said fibers so that they lie flatwise, (or, in other words, parallel or approximately parallel with the face of the walls,) and are seen at the surface of the coatings as separated fibers, which impart a fibrous or textile appearance to said coatings, while permitting the ground to be seen in the (greater or less) spaces between the fibers. Such use is believed to be new as well when the fibers are formed into a sheet, film, relief decoration, or other coating (whether with or without a backing) before it is applied to the wall or in the act of applying it thereto. Such use is believed to be new, irrespective of the admixture of the said fibers with a vehicle to form a paint or coating composition. I have, in fact, discovered that fibers of the before-mentioned kind and length can be delivered in different ways onto an adhesive surface so as to produce a wall-coating of the description just given. This latter invention, so far as it is differentiated from the method of using the fibers in a paint or coating composition, I have reserved for separate application; but the new wall-coatings of the foregoing general description (which can be made by means of the fibrous paints or coating compositions, as well as by a delivery of fibers onto an adhesive surface) and the general improvement in ornamenting the interior walls of houses with such coatings are intended to be secured hereby as well without limitation specifically to the use of the fibrous paints or coating compositions in the production of such wall-coatings as when so limited. The formation of the fibrous-surfaced coating on the wall or in the act of application thereto is more advantageous than the application of ready-formed coatings, and is the subject of special claim.

In making the coatings with glue or other strongly tenacious adhesive vehicle which gives a brittle coat when set or which has a tendency to crack when setting it is an improvement (not essential to the main invention) to add toughening agent or agents such as glycerin, castor-oil, sugar, or the like in small proportion, so as to modify the tendency to crack. Such agents have been used in glue-containing compositions of various kinds, and it is only their use in the fibrous-surfaced coatings or in the compositions for making the same, as herein set forth, which forms a part of the present invention. The glycerin or like agent can be most conveniently added to the glue or like substance when this is in solution; but the invention is not restricted to its incorporation at any particular stage.

It is also an improvement (not essential to the main invention) to use starch or an insoluble jellying substance in connection with glue or soluble gelatinizing substance. The gelatinized starch counteracts the susceptibility of glue when jellied to melt in the water present, and enables it to resist a temperature which would otherwise reduce it to a liquid state. Gelatinized starch (that is, the starch paste used as a common cement) may be employed as the fiber-carrying vehicle, (with or without pigmentary or filling substance;) but its use without glue or some substitute therefor is open to the objection for some purposes that it is too ready to give up water to an underlying surface and may in consequence cause discoloration, whereas with a suitable proportion of glue in admixture therewith it is not apt so to do.

In order to explain as fully as possible how the invention may be made and used, the following formulas are given by way of example or illustration:

Take two and a quarter pounds (2¼ lbs.) of glue equal to that known in commerce as "Cooper's No. 1," ten pounds (10 lbs.) of cobalt-blue, three pounds (3 lbs.) of strong pliable fibers of about three-quarters of an inch or less in length, (coarse fibers in sixteenth to three-eighth inch lengths preferred,) and from about seven and one-half to about twenty-five quarts (7½ to 25 qts.) of water, more or less, according to the consistency desired for the composition. The material referred to as cobalt-blue is an artificial ultramarine, which is known commercially as "cobalt-blue."

For compounding the paint or composition the glue and cobalt-blue had best be in as fine a state of comminution or powder as practicable and the fibers well separated by passage through a screen.

The fibers and the comminuted or powdered substances may be mixed first roughly by repeatedly lifting and dropping the mass and then uniformly by passing the mixture (say two or three times) through a screen of wire-cloth, which may be of about sixteen meshes to the linear inch for the fibers of three-eighths of an inch or less in length and of about four meshes to the linear inch for longer fibers. The mixture of fibers and comminuted substances may be placed in a vessel the bottom of which is constituted by a screen and be delivered through the screen by means of arms revolving horizontally in close proximity to the screen. The sifted mixture should be caught each time after it has fallen not more than three or four inches below the screen. To reduce this dry mixture to a suitable consistency for brushing on, it may be mixed first with seven and a half quarts of boiling water and then thinned with an additional seventeen and a half quarts of cold water. The mass is to be stirred well and the glue dissolved (which will be in about five or ten minutes) before the cold water is added. When the composition has the consistency of a soft jelly, it is ready for use with a brush in the manner employed with ordinary distemper paints. To expedite or aid the jellying of the mixture, the vessel containing the same may be set in a cooling medium, or ice may be put in the mixture instead of water. While it is desirable to thin with cold water in order that the composition may thereby be more quickly cooled and brought to a soft jelly for use, the thinning water may have any desired temperature when added. Any known or suitable means may be used to jelly the composition.

If a stippled effect is desired, the coating may be gone over with a stippling-brush. A number of coats may be applied one over the other, (each coat being allowed to dry before the application of the next.) The coats may be applied also at a future time when it is desired to redecorate the walls without fear of the paint cracking or peeling off.

After the coat is dry its appearance can be modified by washing it (completely or over any desired part) with water, so as to dissolve off the surface color, and thus leave the surface fibers more prominent and (if they be uncolored or differently colored from the pigment forming part of the vehicle) contrasting with the ground.

If the composition is to be applied as a plastic paint to form relief decorations or other thick coatings by squeezing through a hollow tool, (or otherwise,) the use of the original seven and a half quarts of boiling water will generally reduce it to an appropriate consistency; but more or less water may be used, as the judgment of the user may dictate or according to the plasticity or fluidity desired. An addition of about twelve to eighteen fluid ounces of glycerin to the glue solution will toughen the glue. Such glycerin is useful also in paints to be applied with brushes.

It is well after adding the boiling water to the glue and stirring the mixture well until the glue is dissolved to set the vessel containing the mixed composition in a cooling medium. When cool and plastic enough to retain the form given it when forced through a hollow tool for giving it design, the paint or composition is ready for use with such tool or other appropriate implement. Should it become too stiff, it may be softened by warming until the desired consistency is obtained. If, on the contrary, the plastic paint becomes too soft to give the relief effects, it can (unless too much water is present) be stiffened by placing the vessel in cold water or other cooling medium. The plastic paint may be used at various temperatures. By raising the temperature less water is needed. For example, by using the paint hot good results have been obtained with five quarts of boiling water.

Another formula consists of one and a quarter pounds (1¼ lbs.) of comminuted glue, ten pounds (10 lbs.) of orange chrome, six ounces (6 oz.) of carmine, one and three-quarters pounds (1¾ lbs.) of fibers, and from about four and a half quarts (4½ qts) to fourteen and three-quarters quarts, (14¾ qts.,) more or less, of water, with or without six and a half to ten fluid ounces (6½ to ten fl. oz.) of glycerin. The solid substance may be mixed in the dry state, as described in the first formula, and then mixed with about four and a half quarts (more or less) of boiling water, with or without six and a half fluid ounces of glycerin (if the composition is to be squeezed through a hollow tool) and with an additional quantity of cold water (say about ten and a fourth quarts, more or less,) to thin the mixture if it is to be brushed on as a more fluid paint.

Although it is preferred to use only highly-colored pigmentary or filling substances in connection with the fibers, others may be used either alone or in connection with highly-colored substances. Whiting, chalk, magnesia, pumice-stone, and calcined or uncalcined gypsum are some of the substances which may be employed as fillers.

Fibers of hair, wool, cotton, flax or linen, jute, hemp, silk, and other suitable fibers may be used in both the formulas in the weights therein given. Manila hemp gives an excellent effect. That of wool is softer, and coarse wool is preferred to finer grades. The hair of cows and horses produce desirable textures, coarser fibers being preferred to finer ones.

If it be desired to reduce the amount of filling substance or to omit the same, this may be done. It suffices to use the before-mentioned amounts of glue and fibers, the glue being appropriately reduced with water. The same amounts of water may be used. For application with a brush it suffices to reduce the glue to the consistency of a soft jelly, which holds the fibers so that they can be applied. Such a coating could be brushed over a hardened coating of previously-applied paint containing fibers and a pigmentary substance or substances, or it could be applied over any desired surface. It might of course be stained, as, for example, by dissolving color in the water used to reduce the glue to jelly.

It is not absolutely essential, although far more desirable, to use the glue as a jelly, for glue so reduced as to form a tenacious adhesive or slimy solution can be used as a vehicle to carry the fibers in brush-coating. Repeated coats in such paint should be made in order to yield a coating having a fibrous or textile appearance, and, if necessary, the paint should be stirred to prevent settling.

The ratio of the glue to the fibers may be less or more than given in the formulas above. With eighth-inch fibers of Manila hemp and without pigmentary or filling substances I have used as small a ratio as half a pound of glue to one pound of fibers. With the same fibers, but with twice as much (in weight) of cobalt-blue as of fibers, I have used the still smaller ratio of three-eighths of a pound of glue to one pound of fibers. In these cases, when about five quarts of hot water were used to the half pound of glue or about four quarts to three-eighths of a pound of glue, the resulting compounds when cold were stiff enough to be worked through a squeezing-tool. When so much water is used hot, less water (say from about three to four pints of cold water) suffices for thinning the jelly, so that it can be spread with a brush. With the same fibers and cobalt-blue at the ratio of about three and a third pounds of said blue to the pound of fibers (which corresponds to the first formula) I have successfully tried a formula in which glue was used in the ratio of half a pound of glue to the amounts just named of fibers and cobalt-blue. On the other hand, with the same fibers and with from two to six times the weight of cobalt-blue as of fibers, or without pigmentary or filling substance, I have obtained fibrous-sufaced coatings while using a ratio of four pounds of glue to one pound of fibers. So large a proportion of glue is not recommended. To reduce it for brush-coating, it is well to use twenty quarts of boiling water and twenty quarts of cold water to the four pounds of glue and one pound of fibers, while for working through a squeezing-tool five quarts of boiling water may be used.

The ratio of pigment or filler to the glue and fibers may also be more than the proportion given in the formulas. For example, I have obtained fibrous-surfaced coatings with a composition in which one pound of eighth-inch fibers of Manila hemp and three-fourths of a pound of glue (equal to Cooper's No. 1) were mixed with fifteen pounds of cobalt-blue, the mixture being reduced with eight quarts of hot and eight quarts of cold water and applied with a brush. Even larger amounts of pigment may be used.

In estimating the amounts of pigment or filler the difference in specific gravity of the different substances should be taken into consideration.

Practically the formula-maker (say the decorator who mixes his own paints or compositions, the manufacturer who puts up the dry compositions ready for reduction by the user, or whoever may wish to use the invention in other formulas than those given above) can most conveniently make small tests with, say, an ounce of the desired fibers and can regulate the larger batches in accordance with the results thus obtained. If in making these tests with a properly-reduced composition the fibers should ball under the brush or should choke in the nozzles of the squeezing-tools, (of suitable bore,) or should the fibers appear to be mainly or almost exclusively in the middle of the thick coatings, the difficulty can generally be cured by increasing the glue. If the fibers are as well distributed on the surfaces as in the middle of the thick coatings or do not ball under the brush in making thin coatings, while yet in either case the coating formed simply shows stray fibers instead of a fibrous or textile appearance, the cure would be to decrease the amount of filler or pigment or the amount of glue or the amounts of both until the desired fibrous appearance is obtained. When two or more coats may be applied and the fibers of the lower coats or coat be visible through those after applied, the desired fibrous appearance may be obtained as the combined effect of the fibers in the different coats.

If glue stronger or weaker than Cooper's No. 1 is used, a less or greater amount may be used, and if it is desired to use other tenacious adhesive materials, jellying or non-jellying, they are to be selected and compounded in the light of the foregoing explanations, so as to secure a vehicle of proper consistency and adhesive tenacity to carry and hold a suitable amount of fibers of the before-mentioned length to impart a fibrous or textile appearance to the coatings.

Starch (corn-starch, for example) can be used in nearly the proportions (by weight) given for glue, although it is somewhat less tenacious and (if used without sufficient glue) is open to the objection before noted. A proper formula containing the two forms of gelatinous substances (namely, the soluble glue and insoluble starch) is a quarter of a pound of glue and a quarter of a pound of starch to a pound of fibers, with or without six or eight fluid ounces of glycerin and with or without pigmentary or filling substances in suitable proportion, (say two pounds of cobalt-blue.) For working through a squeezing-tool it may be reduced with four quarts of boiling water and for brush-coating with twelve quarts of boiling water. The water should be added quickly while at boiling temperature in order to cook (or gelatinize) the starch.

I claim as my invention or discovery—

1. A paint or coating composition, consisting of strong pliable fibers with a maximum length of three-quarters of an inch, and a strongly tenacious adhesive vehicle combined with such fibers, so as to form a composition in which the fibers shall remain diffused, which can be applied to walls with a brush or squeezing-tool or other decorator's tool, and which when so applied shall give coatings with a fibrous or textile appearance, substantially as described.

2. A paint or coating composition, consisting of strong pliable fibers with a maximum length of three-quarters of an inch, and a strongly tenacious adhesive vehicle reduced or reducible with water, combined with such fibers so as to form a composition in which the fibers shall remain diffused, which can be applied to walls with a brush or a squeezing-tool or other decorator's tool, and which when so applied shall give coatings with a fibrous or textile appearance, substantially as described.

3. A paint or coating composition, consisting of strong pliable fibers with a maximum length of three-quarters of an inch, and a substance, such as glue or starch, reduced or reducible with water to a jelly or tenacious adhesive solution, combined with such fibers so as to form a composition in which the fibers shall remain diffused, which can be applied to walls with a brush or squeezing-tool or other decorator's tool, and which when so applied shall give coatings with a fibrous or textile appearance, substantially as described.

4. A paint or coating composition, consisting of strong pliable fibers with a maximum length of three-quarters of an inch, comminuted pigmentary or filling substance, and a strongly tenacious adhesive vehicle combined with such fibers and pigmentary or filling substance so as to form a composition in which the fibers shall remain diffused, which can be applied to walls with a brush or squeezing-tool or other decorator's tool, and which when so applied shall give coatings with a fibrous or textile appearance, substantially as described.

5. A paint or coating composition, consisting of strong pliable fibers with a maximum length of three-quarters of an inch, comminuted pigmentary or filling substance, and a strongly tenacious adhesive vehicle, reduced or reducible with water, combined with such fibers and pigmentary or filling substance so as to form a composition in which the fibers shall remain diffused, which can be applied to walls with a brush or a squeezing-tool or other decorator's tool, and which when so applied shall give coatings with a fibrous or textile appearance, substantially as described.

6. A paint or coating composition, consisting of strong pliable fibers with a maximum length of three-quarters of an inch, comminuted pigmentary or filling substance, and a substance, such as glue or starch, reduced or reducible with water to a jelly or a tenacious adhesive solution, combined with such fibers and pigmentary or filling substance so as to form a composition in which the fibers shall remain diffused, which can be applied to walls with a brush or a squeezing-tool or other decorator's tool, and which when so applied shall give coatings with a fibrous or textile appearance, substantially as described.

7. A paint or coating composition, consisting of strong pliable fibers with a maximum length of three-quarters of an inch, intermingled in the dry state with a dry comminuted substance, such as glue or starch, reducible to a jelly or tenacious adhesive solution, so as to form when appropriately reduced compositions in which the fibers shall remain diffused, which can be applied to walls with a brush or squeezing-tool or other decorator's tool, and which when so applied shall give coatings with a fibrous or textile appearance, substantially as described.

8. A paint or coating composition, consisting of strong pliable fibers with a maximum length of three-quarters of an inch, intermingled in the dry state with a dry comminuted substance, such as starch or glue, reducible to a jelly or tenacious adhesive solution, and with dry comminuted pigmentary or filling substance, so as to form when appropriately reduced compositions in which the fibers shall remain diffused, which can be applied to walls with a brush or a squeezing-tool or other decorator's tool, and which when so applied shall give coatings with a fibrous or textile appearance, substantially as described.

9. The method of obtaining fibrous-surfaced coatings with prominent fibers, by introducing the fibers into a paint or coating composition, forming the coating, and washing the surface with a solvent liquid, substantially as described.

10. The method of giving a fibrous appearance to surfaces or coatings, by mixing with a strongly tenacious adhesive vehicle which yields a transparent or translucent coat, fibers with a maximum length of three-quarters of an inch, and applying over the surface or coating to be rendered fibrous a transparent or translucent coat of such mixture leaving the fibers distributed over the same so that the said coating or surfaces may appear between the fibers, substantially as described.

11. A paint or coating composition composed of strong pliable fibers with a maximum length of three-quarters of an inch, in admixture with a strongly tenacious adhesive vehicle yielding a transparent or translucent coat, so as to form a composition in which the fibers shall remain diffused, which can be applied to walls with a brush or squeezing-tool or other decorator's tool, and which when so applied shall give coatings with a fibrous or textile appearance, substantially as described.

12. A wall-coating in the form of a sheet, film, relief decoration or the like, comprising fibers with a maximum length of three-quarters of an inch arranged parallel or approximately parallel with the surface of the coating and appearing in sufficient number and at such small intervals as to impart a fibrous or textile appearance to the coating whose ground is visible between fibers, substantially as described.

13. A wall-coating in the form of a sheet, film, relief decoration or the like, comprising fibers with a maximum length of three-quarters of an inch arranged parallel or approximately parallel with the surface of the coating and of a different color from the ground of the coating, said fibers appearing at the surface of the coating as lines of contrasting color in sufficient number and at such small intervals as to impart a fibrous or textile appearance to the coating whose ground is visible between fibers, substantially as described.

14. The improvement in ornamenting the interior walls of houses, by applying to the wall a fibrous-surfaced coating with separated fibers of a strong pliable nature and a maximum length of three-quarters of an inch, so that said fibers shall lie parallel or approximately parallel with the surface of the wall and appear in sufficient number and at such small intervals as to impart a fibrous or textile appearance while permitting the ground to be visible in the spaces between fibers, substantially as described.

15. The improvement in ornamenting the interior walls of houses, by applying to the wall a suitably consistent and strongly tenacious adhesive substance or composition, and separated fibers of a strong pliable nature with a maximum length of three-quarters of an inch, so that said fibers shall be cemented to the wall by said substance or composition in a position parallel or approximately parallel with the face of the wall and shall appear in sufficient number and at such small intervals as to impart a fibrous or textile appearance while permitting the ground to be visible through spaces between fibers, substantially as described.

16. A paint or coating composition, consisting of strong pliable fibers with a maximum length of three-quarters of an inch, mixed with a strongly tenacious adhesive vehicle in which are combined a strongly tenacious adhesive substance, and a toughening agent, such as glycerin, so that the whole forms a composition in which the fibers shall remain diffused, which can be applied to walls with a brush or squeezing-tool or other decorator's tool, and which when so applied shall give toughened coatings with a fibrous or textile appearance, substantially as described.

17. A paint or coating composition, consisting of strong pliable fibers with a maximum length of three-quarters of an inch, mixed with a vehicle comprising both soluble and insoluble jellying substances, such as glue or starch, reduced or reducible with water, so as to form a composition in which the vehicle when jellied is less sensitive to heat than one comprising soluble substance only, in which the fibers shall remain diffused, which can be applied to walls with a brush or squeezing-tool or other decorator's tool, and which when so applied shall give coatings with a fibrous or textile appearance, substantially as described.

In testimony whereof I affix my signature in presence of two witnesses.

HENRY M. JOHNSTON.

Witnesses:
WILLIAM H. TUCKER,
WILLIAM L. SMITH.